(12) United States Patent
Kawai et al.

(10) Patent No.: US 8,281,452 B2
(45) Date of Patent: Oct. 9, 2012

(54) WIPER DEVICE

(75) Inventors: Shinya Kawai, Kosai (JP); Takatsugu Takai, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 449 days.

(21) Appl. No.: 12/634,180

(22) Filed: Dec. 9, 2009

(65) Prior Publication Data

US 2010/0146726 A1 Jun. 17, 2010

(30) Foreign Application Priority Data

Dec. 11, 2008 (JP) ................ 2008-315205
Dec. 11, 2008 (JP) ................ 2008-315206
Dec. 11, 2008 (JP) ................ 2008-315207

(51) Int. Cl.
*B60S 1/04* (2006.01)
*B60S 1/18* (2006.01)
*B60S 1/24* (2006.01)

(52) U.S. Cl. ............ 15/250.3; 15/250.27; 15/250.31; 296/96.17

(58) Field of Classification Search ............ 15/250.14, 15/250.27, 250.3, 250.31; 74/42, 43; 296/96.15, 296/96.17
See application file for complete search history.

(56) References Cited

U.S. PATENT DOCUMENTS

| | | | | |
|---|---|---|---|---|
| 5,142,941 A * | 9/1992 | Amann et al. | ............ | 74/606 R |
| 5,145,157 A * | 9/1992 | Polk | ............ | 269/266 |
| 6,209,373 B1 * | 4/2001 | Muehlpforte et al. | ............ | 72/58 |
| 6,343,403 B1 * | 2/2002 | Kanazawa | ............ | 15/250.3 |
| 6,421,873 B1 * | 7/2002 | Zimmer | ............ | 15/250.3 |
| 6,510,580 B1 * | 1/2003 | Saitou | ............ | 15/250.31 |
| 6,588,047 B2 * | 7/2003 | Burkard et al. | ............ | 15/250.3 |
| 6,718,593 B2 * | 4/2004 | Shido | ............ | 15/250.31 |
| 6,854,154 B2 * | 2/2005 | Masuda | ............ | 15/250.31 |
| 7,249,394 B2 * | 7/2007 | Iwata | ............ | 15/250.27 |
| 7,743,457 B2 * | 6/2010 | Metz | ............ | 15/250.31 |
| 7,891,043 B2 * | 2/2011 | Kraus et al. | ............ | 15/250.31 |
| 8,136,198 B2 * | 3/2012 | Tajima | ............ | 15/250.3 |
| 8,156,604 B2 * | 4/2012 | Kraus et al. | ............ | 15/250.31 |
| 2003/0077013 A1 * | 4/2003 | Zimmer | ............ | 384/415 |
| 2004/0163483 A1 * | 8/2004 | Hawighorst | ............ | 74/42 |
| 2004/0226128 A1 * | 11/2004 | Sugiyama | ............ | 15/250.31 |
| 2008/0235894 A1 * | 10/2008 | Tajima | ............ | 15/250.27 |
| 2009/0271939 A1 * | 11/2009 | Benner et al. | ............ | 15/250.31 |

FOREIGN PATENT DOCUMENTS

JP 3215671 10/2001

(Continued)

*Primary Examiner* — Robert Canfield
(74) *Attorney, Agent, or Firm* — Sheridan Ross P.C.

(57) ABSTRACT

A wiper device includes first and second pivot shafts, first and second pivot holders, a hollow frame, a drive source, and a link rod. The first and second pivot holders are fixed to a vehicle body, pivotally support the first and second pivot shafts, and include first and second attachment shafts, respectively. The hollow frame couples the pivot holders to each other. The link rod transmits drive force of the drive source to the first and second pivot shafts. The hollow frame includes first and second coupling-fixing portions and a drive source fixing portion. The first and second attachment shafts are respectively crimped and fixed to the coupling-fixing portions. Axes of the first and second coupling-fixing portions lie along a straight line. The hollow frame is bent so as to arrange the drive source fixing portion spaced apart from the first and second pivot holders in a direction extending from the distal ends towards basal ends of the pivot shafts.

13 Claims, 5 Drawing Sheets

FOREIGN PATENT DOCUMENTS

| | | |
|---|---|---|
| JP | 3492938 | 2/2004 |
| JP | D1357653 | 3/2009 |
| JP | D1357654 | 3/2009 |
| JP | D1357888 | 3/2009 |
| JP | D1364909 | 6/2009 |
| JP | D1364910 | 6/2009 |
| JP | D1364911 | 6/2009 |
| JP | 2009-208740 | 9/2009 |

* cited by examiner

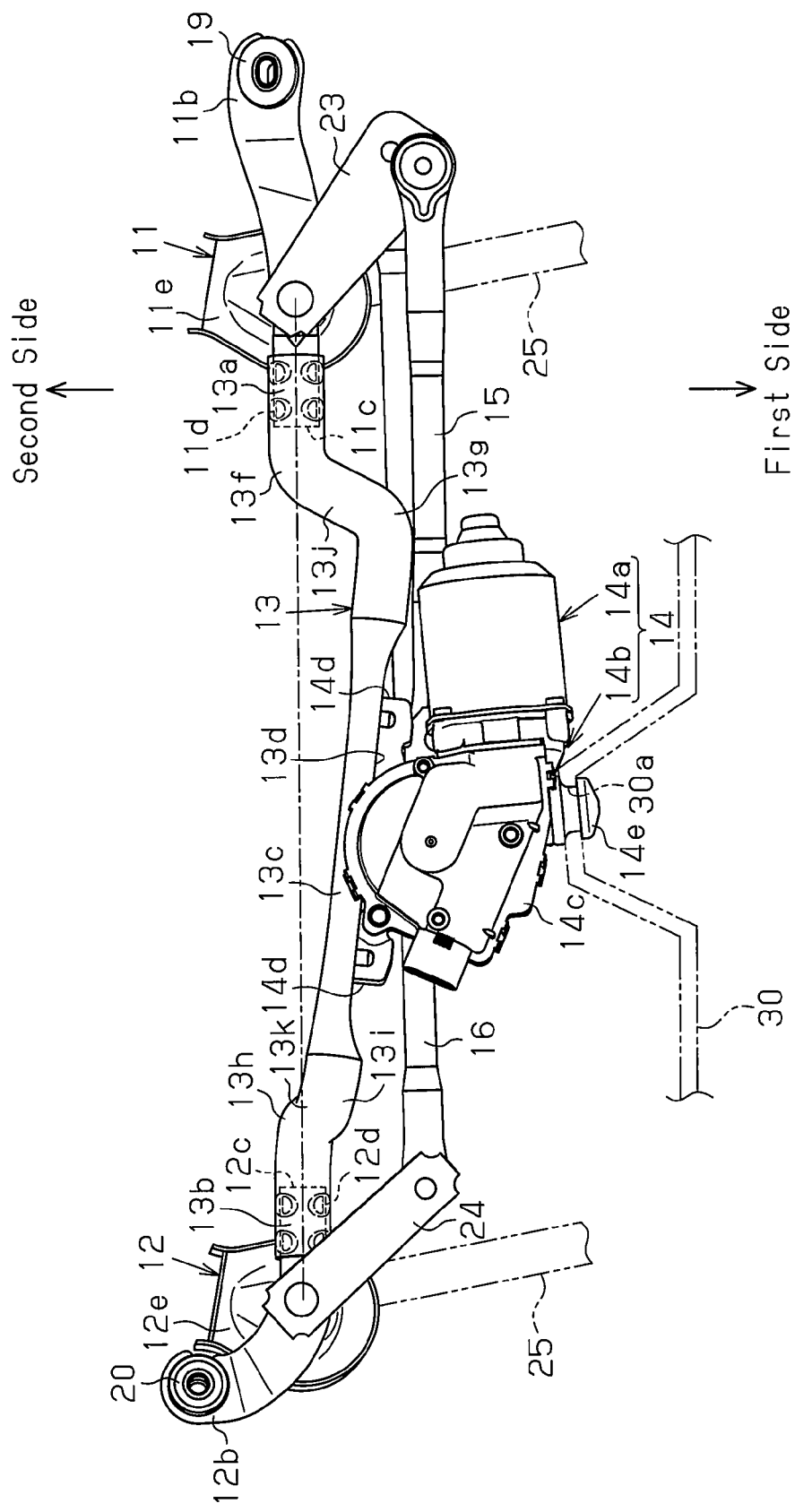

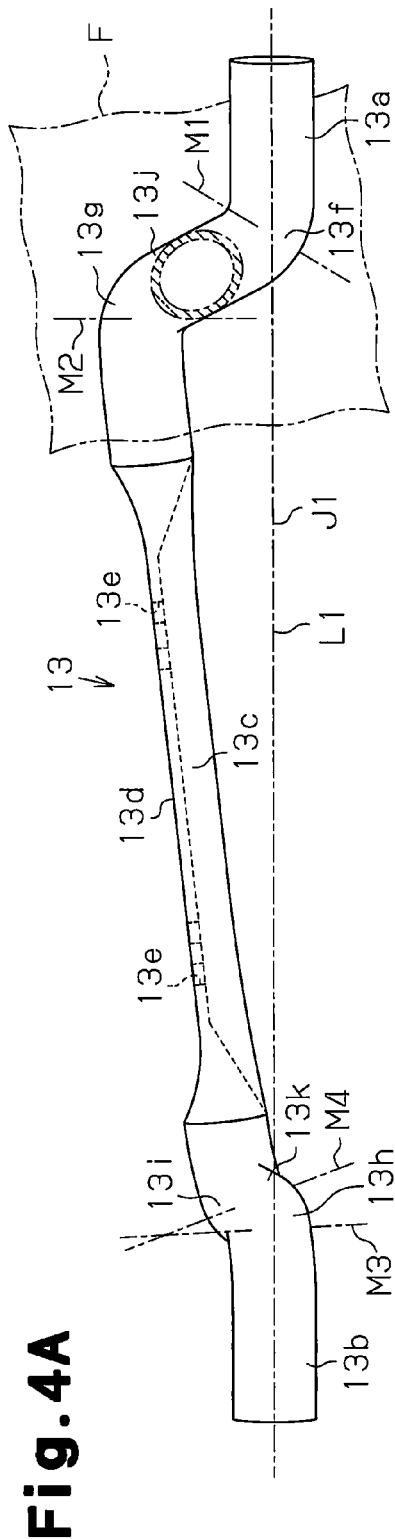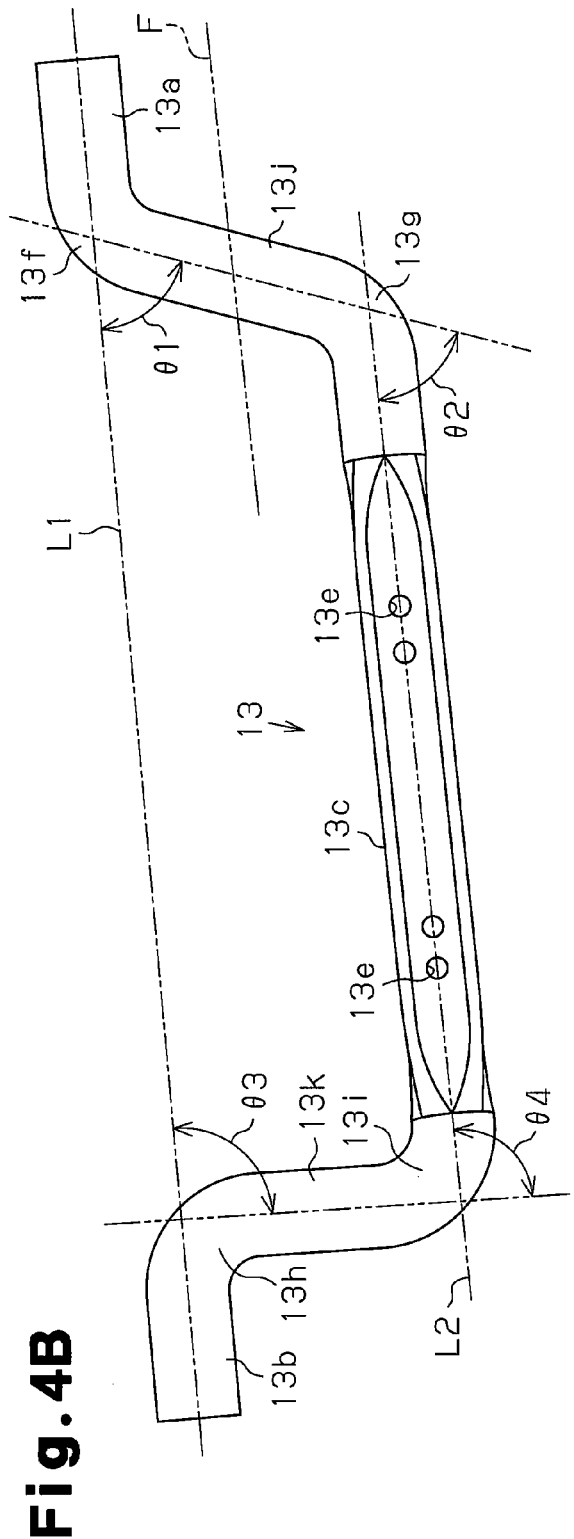
Fig.4A
Fig.4B

WIPER DEVICE

BACKGROUND OF THE INVENTION

The present invention relates to a wiper device fixed to a vehicle body.

Japanese Patent No. 3215671 discloses a wiper device that is fixed to a vehicle body of an automobile or the like and includes two pivot holders, a hollow frame, a drive source, and a link rod. The two pivot holders pivotally support pivot shafts and are each fixed to the vehicle body. The hollow frame is a hollow member that couples the pivot holders to each other. The drive source is fixed to the hollow frame. The link rod transmits the drive force of the drive source to the pivot shaft. The pivot shaft has a distal end fixed to a wiper arm. A wiper blade is coupled to the wiper arm to wipe off raindrops or the like from the surface of the windshield.

Such a wiper device may be made compact, light, and inexpensive by minimizing the pivot holder, which is manufactured with a mold having a complicated shape, and reducing the scale of the molding device while using the hollow frame, which is formed by a hollow member. In other words, in a module type wiper device, the mold and molding device become extremely large and expensive when integrally manufacturing one of the pivot holders with a motor bracket, to which the wiper motor is fixed. However, the wiper device of Japanese Patent No. 3215671 avoids this problem.

From the viewpoint of further impact absorption, there is now a demand for arranging the drive source, which is a rigid body, at a location in the vehicle body that is spaced from the hood of the vehicle body in a direction extending from the distal ends to the basal ends of the pivot shafts, that is, in an area in the vehicle body at the lower side of the windshield. In such a form, a structure that is advantageous for manufacturing or an optimal structure that takes into consideration the drive mechanism is desirable.

SUMMARY OF THE INVENTION

It is an object of the present invention to provide a wiper device having a structure that is advantageous for manufacturing or an optimal structure that takes into consideration the drive mechanism while arranging a drive source at a location spaced from pivot holders in a direction extending from the distal end to the basal end of a pivot shaft.

To achieve the above object, one aspect of the present invention provides a wiper device including first and second pivot shafts, first and second pivot holders, a hollow frame, a drive source, and a link rod. The first and second pivot shafts each have a distal end to which a wiper arm is fixed. The first and second pivot holders are fixed to a vehicle body, pivotally support the first and second pivot shafts, and include first and second attachment shafts, respectively. The hollow frame is formed by a hollow member and couples the pivot holders to each other. The drive source is fixed to the hollow frame. The link rod transmits drive force of the drive source to the first and second pivot shafts. The hollow frame includes first and second coupling-fixing portions and a drive source fixing portion, which is arranged between the first and second coupling-fixing portions and fixed with the drive source. The first and second attachment shafts are respectively crimped and fixed to the coupling-fixing portions in a state inserted into the corresponding coupling-fixing portions along axes of the coupling-fixing portions, and the axes of the first and second coupling-fixing portions lie along a straight line. The hollow frame is bent so as to arrange the drive source fixing portion spaced apart from the first and second pivot holders in a direction extending from the distal ends towards basal ends of the pivot shafts.

To achieve the above object, a further aspect of the present invention provides a wiper device including first and second pivot shafts, first and second pivot holders, a hollow frame, a drive source, a drive link rod, and a synchronization link rod. The first and second pivot shafts each have a distal end to which a wiper arm is fixed. First and second pivot holders are fixed to a vehicle body, pivotally support the first and second pivot shafts, and include first and second attachment shafts, respectively.

The hollow frame is formed by a hollow member, which couples the pivot holders to each other. The drive source is fixed to the hollow frame. The drive link rod transmits drive force of the drive source to the first pivot shaft. The synchronization link rod further transmits drive force of the drive link rod to the second pivot shaft. The hollow frame includes first and second coupling-fixing portions, which are respectively fixed to the first and second pivot holders, and a drive source fixing portion, which is arranged between the first and second coupling-fixing portions and fixed with the drive source. The hollow frame is bent so as to arrange the drive source fixing portion spaced apart from the first and second pivot holders in a direction extending from the distal ends towards basal ends of the pivot shafts. The hollow frame includes a first crank portion, which is bent to be crank-shaped and extends between the drive source fixing portion and the first pivot holder. The first crank portion includes first and second bent sections respectively bent about bending axes, which are not parallel to each other.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a bottom view of the wiper device according to the present embodiment;

FIG. 4A is a plan view of a hollow frame according to the present embodiment;

FIG. 4B is a front view of the hollow frame according to the present embodiment.

DETAILED DESCRIPTION OF THE PREFERRED EMBODIMENTS

Figure 1:
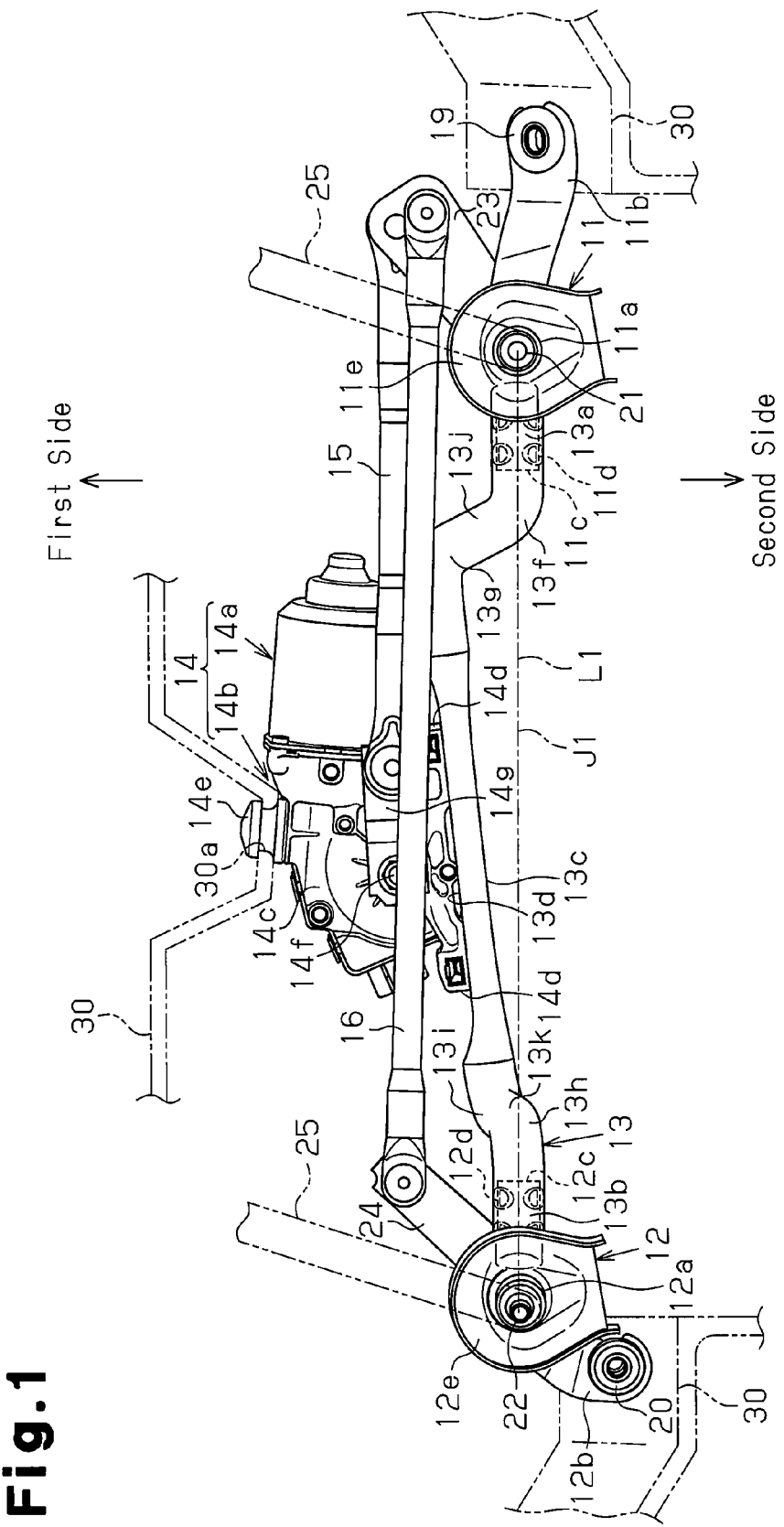
FIG. 1 is a plan view of a wiper device according to a present embodiment.

One embodiment of the present invention will now be discussed with reference to FIGS. 1 to 5. FIG. 1 is a plan view of a wiper device according to the present embodiment, FIG. 2 is a front view of the wiper device, and FIG. 3 is a bottom view of the wiper device.

Figure 2:
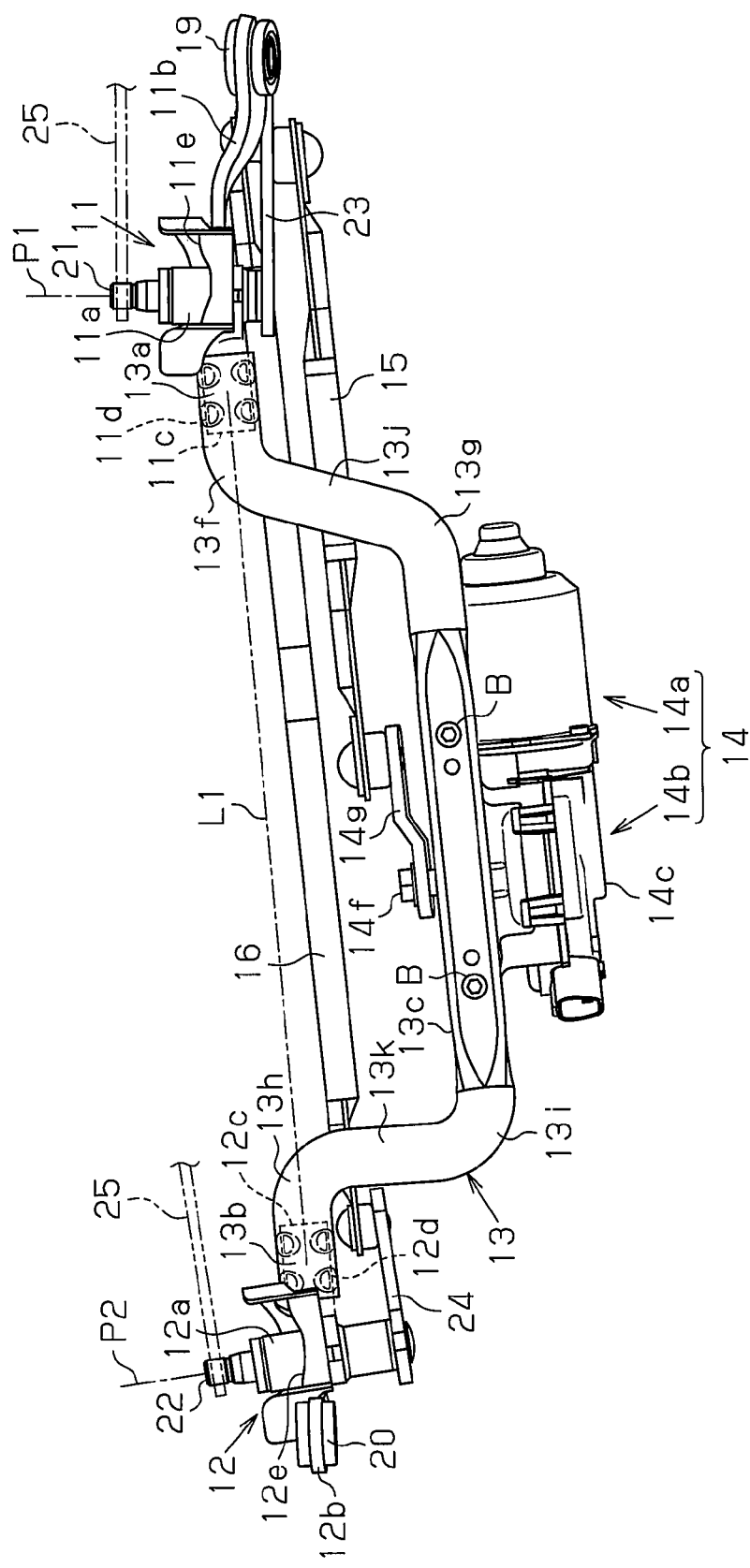
FIG. 2 is a front view of the wiper device according to the present embodiment.

As shown in FIGS. 1 to 3, the wiper device includes first and second pivot holders 11 and 12, a hollow frame 13, a motor 14 serving as a drive source, and two link rods, which are a drive link rod 15 and a synchronization link rod 16.

The pivot holders 11 and 12 are casted products formed from an aluminum alloy and respectively includes tubular pivot supporting portions 11a and 12a, a vehicle body fixing portions 11b and 12b extending in a direction substantially perpendicular to an axial direction of the pivot supporting portions 11a and 12a, attachment shafts 11c and 12c extending in a direction perpendicular to the axial direction of the pivot supporting portions 11a and 12a at locations differing from the locations of the vehicle body fixing portions 11b and 12b, and water catch portions 11e and 12e extending radially outward to be dish-shaped from the pivot supporting portions 11a and 12a. The catch portions 11e and 12e may be formed as discrete resin components fixed to the pivot supporting portions 11a and 12a. The pivot supporting portions 11a and 12a respectively receive and pivotally support first and second pivot shafts 21 and 22. The pivot shafts 21 and 22 each have a distal end fixed to a wiper arm 25, which is not shown. The wiper arm 25 has a distal end, which supports a wiper blade. The pivot shafts 21 and 22 have basal ends respectively fixed to first and second pivot levers 23 and 24, which swing (pivot) integrally with the pivoting of the pivot shafts 21 and 22. Rubber vibration dampers 19 and 20 are attached to the distal ends of the vehicle body fixing portions 11b and 12b, and the vehicle body fixing portions 11b and 12b are fastened and fixed to a vehicle body 30 (and its attachment brackets) by bolts (not shown) with the rubber vibration dampers 19 and 20 arranged in between (refer to FIGS. 1, 3, and 5). The attachment shafts 11c and 12c are solid and have a circular cross-section. Further, the attachment shafts 11c and 12c have an outer surface including a plurality of crimping recesses 11d and 12d.

The hollow frame 13 is a hollow member (pipe) formed from a zinc steel plate to be tubular and couples the two pivot holders 11 and 12 to each other. Specifically, the hollow frame 13 includes first and second coupling-fixing portions 13a and 13b, which allow for the insertion of the attachment shafts 11c and 12c and are crimped and fixed to the attachment shafts 11c and 12c, and a drive source fixing portion 13c, which is arranged between the coupling-fixing portions 13a and 13b. The hollow frame 13 is bent to space the drive source fixing portion 13c from the pivot holders 11 and 12 in a direction extending from the distal end to 25 basal end of the pivot shafts 21 and 22 (direction extending into the plane of FIG. 1, downward direction as viewed in FIG. 2). The two pivot holders 11 and 12 of the present embodiment are arranged so that when they are fixed to the hollow frame 13, the two pivot shafts 21 and 22 (axes P1, P2 30 (refer to FIG. 2)) are non-parallel to each other in accordance with the curvature or the like of the windshield for the vehicle type, on which they are mounted. Specifically, the two pivot shafts 21 and 22 are arranged so that they are more spaced apart from each other at their distal ends than their basal ends when viewed from the front. The relative inclination of the two pivot shafts 21 and 22 are set in accordance with the curvature or the like of the windshield of the vehicle type on which the wiper device is mounted. Further, the drive source fixing portion 13c is compressed so that it is not hollow and has a cross section in a direction perpendicular to a longitudinal axis L2 that is substantially channel-shaped. The substantially channel shape forms an intermediate planar portion 13d including two attachment holes 13e (refer to FIGS. 4A and 4B). A motor 14 is fixed to the drive source fixing portion 13c (intermediate planar portion 13d).

The motor 14 includes a motor body 14a and a gear portion 14b. Two attachment legs 14d (refer to FIG. 1) corresponding to the attachment holes 13e (refer to FIGS. 4A and 4B FIG. 4) are formed on a housing 14c of the gear portion 14b. The motor 14 is fastened and fixed to the drive source fixing portion 13c (intermediate planar portion 13d) by bolts B (refer to FIG. 2), which extend through the attachment holes 13e (refer to FIGS. 4A and 4B) in a state in which the attachment legs 14d are arranged on the intermediate planar portion 13d of the drive source fixing portion 13c. A rubber support member 14e (refer to FIG. 1) attached to a support pin (not shown), which projects integrally from the housing 14c, is arranged on the housing 14c of the gear portion 14b at the side opposite to the attachment legs 14d. The rubber support member 14e is fitted to and supported by a fitting hole formed in a supporting portion 30a of the vehicle body 30. Thus, the two pivot holders 11 and 12, the hollow frame 13, and the motor 14 of the present embodiment for a single unit that is supported by the vehicle body 30 at three locations, which are the two pivot holders 11 and 12 (vehicle body fixing portions 11b and 12b) and the motor 14 (rubber support member 14e).

The motor 14 has an output shaft 14f, which extends in substantially the same direction as the pivot shafts 21 and 22 (direction extending upward from the plane of FIG. 1, upward direction as viewed in FIG. 2). A crank arm 14g, which rotates integrally with the output shaft 14f, is fixed to the output shaft 14f.

The crank arm 14g has a distal portion drive-coupled to a basal portion of the drive ink rod 15, and the drive link rod 15 has a distal portion drive-coupled to the first pivot lever 23, which swings (pivots) integrally with the first pivot shaft 21 supported by the first pivot holder 11 (right side in FIGS. 1 and 2). The drive link rod 15 of the present embodiment is coupled to the first pivot lever 23 on a first side (upper side in FIG. 1) of a shaft coupling line J1, which extends through the two pivot shafts 21 and 22 in a substantially axial direction (refer to FIG. 1) of the pivot shaft 21 and 22. The wiper device of the present embodiment wipes the windshield, which is fixed to the vehicle body 30, and is attached to the vehicle body 30 so that the first side (upper side as viewed in FIG. 1) of the shaft coupling line J1 corresponds to the rear side of the vehicle.

The synchronization link rod 16 drive-couples the first pivot lever 23 and the second pivot lever 24. The synchronization link rod 16 of the present embodiment is coupled to each of the pivot levers 23 and 24 at the first side (upper side as viewed in FIG. 1) of the shaft coupling line J1.

When the motor 14 is driven, the drive link rod 15 transmits drive force (torque of the crank arm 14g) to the first pivot shaft 21, and the synchronization link rod 16 further transmits the drive force of the drive link rod 15 to the second pivot shaft 22 to synchronously pivot the two pivot shafts 21 and 22.

The characteristic shapes and the like of the wiper device of the present embodiment will now be described in detail.

In the hollow frame 13, the axes of the two coupling-fixing portions 13a and 13b, into which the attachment shafts 11c and 12c of the pivot holders 11 and 12 are inserted, lie along a straight line L1. The attachment shafts 11c and 12c of the pivot holders 11 and 12 are respectively inserted into the coupling-fixing portions 13a and 13b along the straight line L1 (from both left and right sides). In this state, a crimping device such as a crimping jig is used to crimp the circumference of the coupling-fixing portions 13a and 13b. This crimps and fixes the attachment shafts 11c and 12c of the pivot holders 11 and 12. In the present embodiment, the crimping is performed at four areas in the circumferential direction of each of the coupling-fixing portion 13a and 13b and two different positions in the axial direction (straight line L1) of each of the coupling-fixing portions 13a and 13b. In other words, the coupling-fixing portions 13a and 13b each have a total of eight crimping areas. In the present embodiment, straight line L1 is aligned with the shaft coupling line J1 when viewed from the axial direction of the pivot shafts 21, 22. This is because the axes of the pivot supporting portions 11a and 12a of the pivot holders 11 and 12 are substantially perpendicular to the axes of the attachment shafts 11c and 12c.

The hollow frame 13 includes a crank portion, which extends from the coupling-fixing portions 13a and 13b to the drive source fixing portion 13c and is bent to be crank-shaped. The crank portion between the drive source fixing portion 13c and first coupling-fixing portion 13a includes a crank intermediate section 13j and two bent sections (first and second bent sections 13f and 13g) at the two ends of the crank intermediate section 13j. The first and second bent sections 13f and 13g are respectively bent about bending axes M1 and M2 (refer to FIG. 4A), which are not parallel to each other (in a relatively skew positional relationship in the present embodiment).

In detail, among the two bent sections, the first bent section 13f at the side of the coupling-fixing portion 13a is bent from the coupling-fixing portion 13a to extend in a direction from the distal end to the basal end of the pivot shaft 21 (direction extending into the plane of FIGS. 1 and 4A) and to extend towards the first side (upper side as viewed in FIGS. 1 and 4A) of the shaft coupling line J1.

Further, among the two bent sections, the second bent section 13g at the side of the drive source fixing portion 13c is bent so that the drive source fixing portion 13c is arranged at the first side (upper side as viewed in FIGS. 1 and 4A) of the shaft coupling line J1. In the present embodiment, the second bent section 13g is bent so as to shorten the distance of the drive source fixing portion 13c from the shaft coupling line J1 as the second coupling-fixing portion 13b (pivot holder 12) becomes closer. Further, the second bent section 13g is bent so that the drive source fixing portion 13c is substantially parallel to the straight line L1 when viewed from a direction perpendicular to the axis of the pivot shaft 21 (refer to FIGS. 2 and 4B).

The first and second bent sections 13f and 13g respectively have bending angles θ1 and θ2 (refer to FIG. 4B) set to about 73°. FIG. 4B shows the bent sections bent about the bending axes M1 and M2 (refer to FIG. 4A), which are not parallel to each other, from the same point of view. Thus, FIG. 4B does not sufficiently show inclination in the direction perpendicular to the plane of drawing, and the bending angles θ1 and θ2 are shown schematically. The bending angle θ1 is the angle θ1 between the coupling-fixing portion 13a and the crank intermediate section 13j, and the bending angle θ2 is the angle θ2 between the crank intermediate section 13j and the drive source fixing portion 13c.

Moreover, the hollow frame 13 includes a crank portion, which extends from the coupling-fixing portion 13b to the drive source fixing portion 13c and is bent to be crank-shaped. The crank portion between the drive source fixing portion 13c and second coupling-fixing portion 13b includes a crank intermediate section 13k and two bent sections (third and fourth bent sections 13h and 13i) at the two ends of the crank intermediate section 13k. The third and fourth bent sections 13h and 13i are respectively bent about bending axes M3 and M4 (refer to FIG. 4A), which are not parallel to each other (in a relatively skew positional relationship in the present embodiment).

In detail, among the two bent sections, the third bent section 13h at the side of the coupling-fixing portion 13b is bent from the coupling-fixing portion 13b to extend in a direction from the distal end to the basal end of the pivot shaft 21 (direction extending into the plane of FIGS. 1 and 4A) and to extend slightly towards the first side (upper side as viewed in FIGS. 1 and 4A) of the shaft coupling line J1.

Further, among the two bent sections, the fourth bent section 13i at the side of the drive source fixing portion 13c is bent so that the drive source fixing portion 13c is arranged at the first side (upper side as viewed in FIGS. 1 and 4A) of the shaft coupling line J1. In the present embodiment, the fourth bent section 13i is bent so as to lengthen the distance of the drive source fixing portion 13c from the shaft coupling line J1 as the first coupling-fixing portion 13a (pivot holder 11) becomes closer. Further, the fourth bent section 13i is bent so that the drive source fixing portion 13c is substantially parallel to the straight line L1 when viewed from a direction perpendicular to the axis of the pivot shaft 21 (refer to FIGS. 2 and 4B).

The third and fourth bent sections 13f and 13g respectively have bending angles θ3 and θ4 (refer to FIG. 4B) set to about 90°. FIG. 4B shows the bent sections bent about the bending axes M3 and M4 (refer to FIG. 4A), which are not parallel to each other, from the same point of view. Thus, FIG. 4B does not sufficiently show inclination in the direction perpendicular to the plane of drawing, and the bending angles θ3 and θ4 are shown schematically. The bending angle θ3 is the angle θ3 between the coupling-fixing portion 13b and the crank intermediate section 13k, and the bending angle θ4 is the angle θ4 between the crank intermediate section 13k and the drive source fixing portion 13c.

Figure 5:
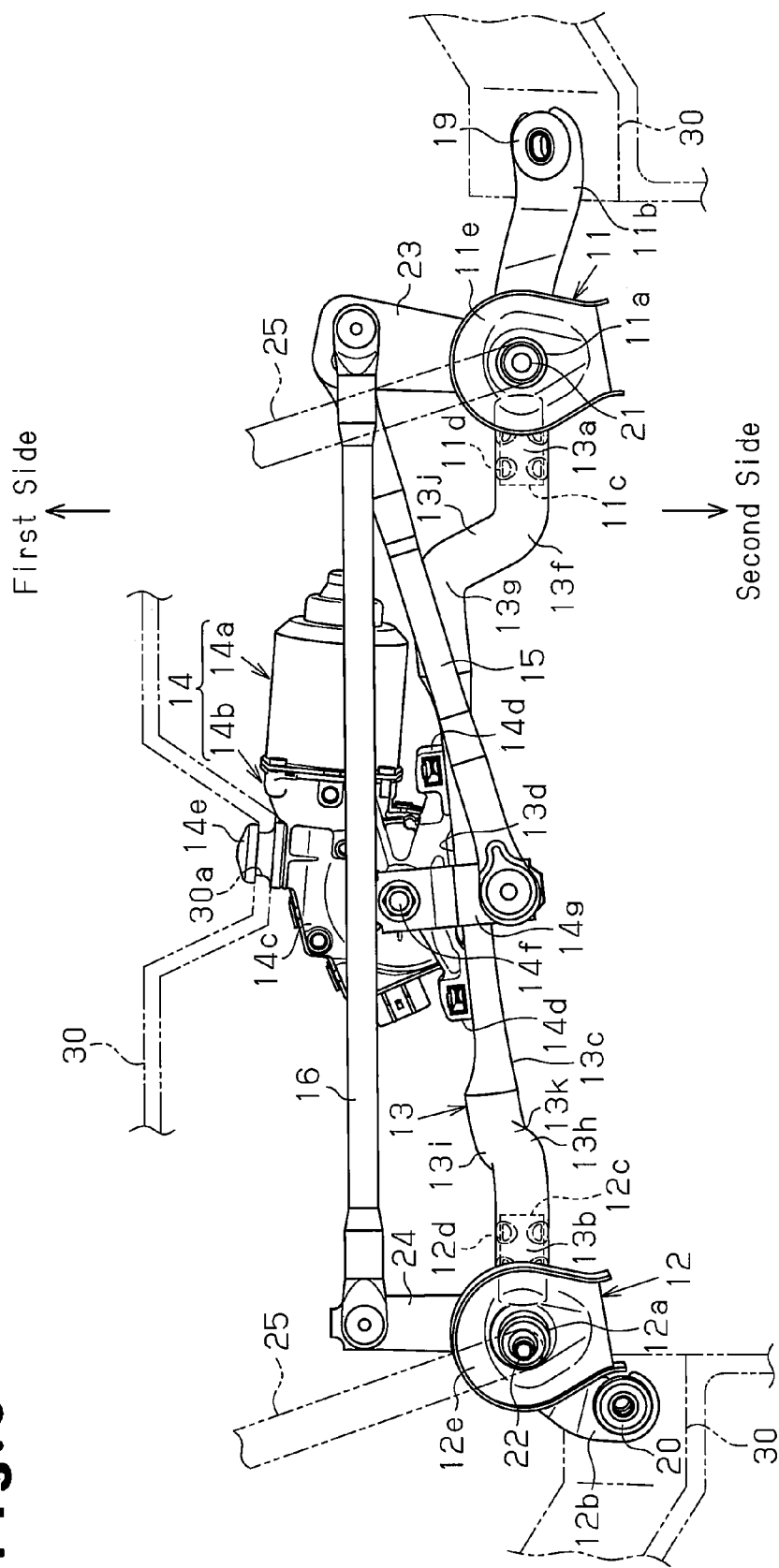
FIG. 5 is a plan view showing the wiper device according to the present embodiment.

When the motor 14 is driven, the drive link rod 15 moves along plane F (refer to FIG. 4B), which intersects the crank intermediate section 13j that couples the first bent section 13f and the second bent section 13g, as viewed from a direction perpendicular to the axis of the pivot shaft 21 (refer to FIG. 2). Nevertheless, the drive link rod 15 is set and arranged so as not to contact the crank intermediate section 13j even when it moves. FIG. 5 is a plan view showing a state in which the motor 14 is driven to move the drive link rod 15 from the state of FIG. 1 to another position. In this manner (refer to FIG. 5), although the drive link rod 15 moves in accordance with the pivotal position of the crank arm 14g and the pivotal position of the first pivot lever 23, it does not interfere with the hollow frame 13 (crank intermediate section 13j) due to the bending and the like described above.

The embodiment has the characteristic advantages described below.

(1) The hollow frame 13 includes the two coupling-fixing portions 13a and 13b, to which the pivot holders 11 and 12 are fixed, and the drive source fixing portion 13c, which is arranged between the two coupling-fixing portions 13a and 13b. The two coupling-fixing portions 13a and 13b are crimped and fixed to the attachment shafts 11c and 12c of the pivot holders 11 and 12, which are inserted to the fixing portions 13a and 13b. The hollow frame 13 is bent so that the drive source fixing portion 13c is arranged to be spaced from the pivot holders 11 and 12 in a direction extending from the distal end towards the basal end of the pivot shafts 21 and 22 with respect. Thus, the motor 14 is arranged within the vehicle body 30 at the lower side of the windshield and away from the hood without using a bracket or the like.

Further, the axes of the two coupling-fixing portions 13a and 13b, into which the attachment shafts 11c and 12c of the pivot holders 11 and 12 are inserted, lie along the straight line L1. Thus, the two coupling-fixing portions 13a and 13b are simultaneously, evenly, and simply crimped in a crimping process with a simple structure in which two crimping jigs of a crimping device are arranged along the straight line L1, that is, without the need for setting beforehand twists or steps in the two crimping jigs. Further, for example, even when the two pivot shafts 21 and 22 have different inclination angles in accordance with the vehicle type (curvature of windshield) or the like, the axes of the two coupling-fixing portions 13a and 13b are set along the straight line L1 (i.e., the axes of the two coupling-fixing portions are not changed in correspondence with the vehicle type). Thus, the two coupling-fixing portions 13a and 13b may be crimped and fixed with the same crimping device using the same setting. Moreover, for example, even when the distance between the axes of the pivot shafts 21 and 22 or when the length and shape of the drive source fixing portion 13c between the coupling-fixing portions 13a and 13b are changed in accordance with the vehicle type or the like, the two crimping jigs are simply moved along the straight line L1 to complete positioning. This facilitates the setting of the crimping device for each variation. Thus, the crimping device is simple and inexpensive.

(2) The two bent sections (first and second bent sections 13f and 13g) between the drive source fixing portion 13c and the first pivot holder 11 (first coupling-fixing portion 13a) are respectively bent about the bending axes M1 and M2 (refer to FIGS. 4A and 4B), which are not parallel to each other. The two bent sections (third and fourth bent sections 13h and 13i) between the drive source fixing portion 13c and the second pivot holder 12 (second coupling-fixing portion 13b) are respectively bent about the bending axes M3 and M4 (refer to FIG. 4A), which are not parallel to each other. Thus, the orientation of the drive source fixing portion 13c, and consequently, the orientation of the motor 14 (e.g., including the inclination of the output shaft 14f of the motor 14 and the like) is set appropriately in accordance with its mounting space in the vehicle, the movement path of the drive link rod 15, and the like while keeping the axes of the two coupling-fixing portions 13a and 13b on the straight line L1 . Further, for example, the motor 14 is easily arranged to be spaced apart from the pivot shafts 21 and 22 in the vehicle body 30 within a range of the mounting space of the vehicle by setting a long interval for the two bent sections arranged on the two sides of the hollow frame 13 (interval of the first bent section 13f and the second bent section 13g and interval of the third bent section 13h and the fourth bent section 13i). In addition, the orientation of the drive source fixing portion 13c, and consequently, the orientation of the motor 14 is appropriately set in accordance with the mounting space of the vehicle, the movement path of the drive link rod 15, and the like in accordance with the bending of the bent sections (first to fourth bent sections 13f to 13i).

(3) The interference between the drive link rod 15 and the hollow frame 13 must be avoided at the side of the first pivot holder 11, to which drive force is transmitted from the drive link rod 15. In the present embodiment, the two bent sections (first and second bent sections 13f and 13g) between the drive source fixing portion 13c and the first pivot holder 11 are respectively bent about the bending axes M1 and M2 (refer to FIG. 4A), which are not parallel to each other. Thus, the interference between the hollow frame 13 and the drive link rod 15 is easily avoided without increasing the number of bending processes. Further, the strength of the drive link rod 15 that counters the rod thrust decreases when the drive link rod 15 is bent to avoid interference between the hollow frame 13 and the drive link rod 15. However, this is prevented.

(4) The motor 14 is fixed to the drive source fixing portion 13c and supported by the supporting portion 30a of the vehicle body 30. In the present embodiment, the two bent sections (first and second bent sections 13f and 13g) between the drive source fixing portion 13c and the first pivot holder 11 are respectively bent about the bending axes M1 and M2 (refer to FIG. 4A), which are not parallel to each other. Further, the two bent sections (third and fourth bent sections 13h and 13i) between the drive source fixing portion 13c and the second pivot holder 12 are respectively bent about the bending axes M3 and M4, which are not parallel to each other. Thus, the motor 14 is easily arranged in accordance with the position of the supporting portion 30a of the vehicle body 30. The insertion direction of the rubber support member 14e relative to the fitting hole of the supporting portion 30a may be easily changed without exchanging the motor 14 by changing the orientation of the drive source fixing portion 13c, that is, the orientation of the motor 14. Further, when the positions at which the two pivot holders 11 and 12 are fixed and the position at which the motor 14 is supported are already set on the vehicle body 30, the wiper device may be arranged just by changing the shape and orientation of the drive source fixing portion 13c, and consequently, the orientation of the motor 14, by simply bending the two bent sections (first and second bent sections 13f and 13g or third and fourth bent sections 13h and 13i) about the bending axes M1 to M4, which are not parallel to each other and without requiring significant changes in other members.

(5) The two bent sections (first and second bent sections 13f and 13g) between the drive source fixing portion 13c and the first pivot holder 11, to which the drive source is transmitted from the drive link rod 15), are set to have a smaller bending angle (about 73°) than the two bent sections (third and fourth bent sections 13h and 13i) between the drive source fixing portion 13c and the second pivot holder 12. This increases the rigidity of the bent sections (first and second bent sections 13f and 13g) at the side of the first pivot holder 11, which is where a large load is applied, particularly, when driven in a state in which snow is accumulated. Further, the two bent sections (first and second bent sections 13f and 13g) on the side of the first pivot holder 11 have small bending angles θ1 and θ2. This spontaneously obtains the necessary length of the drive link rod 15 (while reducing unnecessary portions). Specifically, although the necessary length of the drive link rod 15 is determined by the mechanism, the two bent sections (first and second bent sections 13f and 13g) at the side of the drive link rod 15 have small bending angles θ1 and θ2, and the hollow frame 13 at this portion extends obliquely. This spontaneously obtains the necessary length (while reducing unnecessary portions).

The embodiment described above may be modified in the following forms.

In the above-described embodiment, the hollow frame 13 is bent to be substantially crank-shaped between the drive source fixing portion 13c and the first coupling-fixing portion 13a and between the drive source fixing portion 13c and the second coupling-fixing portion 13b. However, the hollow frame 13 may be changed to have another shape as long as the drive source fixing portion 13c is arranged to be spaced apart from the coupling-fixing portions 13a and 13b in the direction extending from the distal end towards the basal end of the pivot shafts 21 and 22. For instance, the hollow frame 13 may be bent to be substantially crank-shaped between the drive source fixing portion 13c and the first coupling-fixing portion 13a to include the first and second bent sections, the second bent section may be bent so that the drive source fixing portion intersects the second coupling-fixing portion 13b, and just one bent section may be arranged on the side of the second coupling-fixing portion 13b (the coupling-fixing portion 13b and the drive source fixing portion are directly coupled).

In the above-described embodiment, the first and second bent sections 13f and 13g are respectively bent about the bending axes M1 and M2 (refer to FIG. 4A), which are not parallel to each other (i.e., skew positional relationship or intersecting positional relationship, skew positional relationship in the embodiment), but are not limited in such a manner and may be respectively bent about parallel bending axes.

In the above-described embodiment, the third and fourth bent sections 13h and 13i are respectively bent about the bending axes M3 and M4 (refer to FIG. 4A), which are not parallel to each other (i.e., skew positional relationship or intersecting positional relationship, skew positional relationship in the embodiment), but are not limited in such a manner and may be respectively bent about parallel bending axes.

In the above-described embodiment, the motor 14 is fixed to the drive source fixing portion 13c and supported by the fitting hole serving as the supporting portion of the vehicle body 30 but is not limited in such a manner and may be indirectly supported (not directly supported by the vehicle body 30) by a different member such as a bracket.

In the above-described embodiment, the bending angles of the two bent sections (first and second bent sections 13f and 13g) between the drive source fixing portion 13c and the first pivot holder 11, to which the drive force is transmitted from the drive link rod 15, are set to be smaller (about 73°) than the bending angles of the two bent sections (third and fourth bent sections 13h and 13i) between the drive source fixing portion 13c and the second pivot holder 12. However, the present invention is not limited in such a manner, and the bending angles of the bent sections (first to fourth bent sections 13f to 13i) may be changed so that they are all substantially the same (e.g., 90°). Alternatively, the bent sections may all have different bending angles. Further, the bending angle of at least one of the bent sections (first to fourth bent sections 13f to 13i) may be greater than 90° so that, for example, to form a substantial Z-like crank shape.

In the above-described embodiment, the straight line L1 lies along the shaft coupling line J1 when viewed from the axial direction of the pivot shafts 21 and 22 but is not limited in such a manner, and the straight line L1 and the shaft coupling line J1 may be deviated from each other. In other words, the axes of the pivot supporting portions 11a and 12a of the pivot holder 11 and 12 and the axes of the attachment shafts 11c and 12c do not have to be perpendicular to each other and may be in a skew positional relationship.

In the above-described embodiment, the bending angle of each bent section is set so that the longitudinal axis L2 of the drive source fixing portion 13c is substantially parallel to the straight line L1 when seen from a direction perpendicular to the axis line of the pivot shaft 21 but is not limited in such a manner, and the longitudinal axis L2 of the drive source fixing portion 13c may be inclined relative to the straight line L1 when seen from the direction perpendicular to the axis line of the pivot shaft 21. The bending angle of each bent section may be set so that the longitudinal axis L2 is in a skew positional relationship with the straight line L1.

In the above-described embodiment, the wiper device is attached to the vehicle body 30 so that the first side of the shaft coupling line J1 corresponds to the rear side of the vehicle but is not limited in such a manner, and the wiper device may be attached to the vehicle body 30 so that the first side of the shaft coupling line J1 corresponds to the front side of the vehicle.

In the above-described embodiment, the drive source fixing portion 13c is compressed to become non-hollow and have a substantially channel-shaped cross-section in the direction perpendicular to its axis but is not limited in such a manner may be a hollow shape in which it is not compressed or only slightly compressed.

In the above-described embodiment, the two coupling-fixing portions 13a and 13b have axes, along which the attachment shafts 11c and 12c of the pivot holders 11 and 12, lying on the straight line L1 but are not limited in such a manner, and the axes, along which the attachment shafts 11c and 12c are inserted, may be separated from the straight line L1. Further, in the above-described embodiment, the attachment shafts 11c and 12c are inserted into the coupling-fixing portions 13a and 13b and then crimped and fixed. However, the present invention is not limited in such a manner, and the attachment shafts 11c and 12c may be fixed through a method other than crimping and fixing such as rivet fixing and bolt fastening.

What is claimed is:

1. A wiper device comprising:
   first and second pivot shafts, each having a distal end to which a wiper arm is fixed;
   first and second pivot holders fixed to a vehicle body, which pivotally support the first and second pivot shafts and include first and second attachment shafts, respectively;
   a hollow frame formed by a hollow member, which couples the pivot holders to each other;
   a drive source fixed to the hollow frame;
   a link rod which transmits drive force of the drive source to the first and second pivot shafts;
   wherein the hollow frame includes first and second coupling-fixing portions, a drive source fixing portion and first and second crank portions;
   the drive source fixing portion is arranged between the first and second coupling-fixing portions and fixed with the drive source;
   the first and second attachment shafts are respectively crimped and fixed to the coupling-fixing portions in a state inserted into the corresponding coupling-fixing portions along axes of the coupling-fixing portions, and the axes of the first and second coupling-fixing portions lie along a straight line; and the hollow frame is bent so as to arrange the drive source fixing portion spaced apart from the first and second pivot holders in a direction extending from the distal ends towards basal ends of the pivot shafts;
   the first crank portion, which is bent to be crank-shaped and extends between the drive source fixing portion and the first pivot holder;
   the second crank portion, which is bent to be crank-shaped and extends between the drive source fixing portion and the second pivot holder; and
   the first crank portion includes first and second bent sections respectively bent about bending axes, which are not parallel to each other; and the second crank portion includes third and fourth bent sections respectively bent about bending axes, which are not parallel to each other.

2. The wiper device according to claim 1, wherein the link rod includes a drive link rod, which transmits the drive force of the drive source to the first pivot shaft, and a synchronization link rod, which further transmits the drive force of the drive link rod to the second pivot shaft.

3. The wiper device according to claim 1, wherein the drive source is fixed to the drive source fixing portion and supported by the vehicle body.

4. A wiper device comprising:
   first and second pivot shafts, each having a distal end to which a wiper arm is fixed;
   first and second pivot holders fixed to a vehicle body, which pivotally support the first and second pivot shafts and include first and second attachment shafts, respectively;
   a hollow frame formed by a hollow member, which couples the pivot holders to each other;
   a drive source fixed to the hollow frame;

a link rod which transmits drive force of the drive source to the first and second pivot shafts;

wherein the hollow frame includes first and second coupling-fixing portions, a drive source fixing portion and first and second crank portions;

the drive source fixing portion is arranged between the first and second coupling-fixing portions and fixed with the drive source;

the first and second attachment shafts are respectively crimped and fixed to the coupling-fixing portions in a state inserted into the corresponding coupling-fixing portions along axes of the coupling-fixing portions, and the axes of the first and second coupling-fixing portions lie along a straight line; and the hollow frame is bent so as to arrange the drive source fixing portion spaced apart from the first and second pivot holders in a direction extending from the distal ends towards basal ends of the pivot shafts;

the link rod includes a drive link rod, which transmits the drive force of the drive source to the first pivot shaft, and a synchronization link rod, which further transmits the drive force of the drive link rod to the second pivot shaft;

the first crank portion is bent to be crank-shaped and extends between the drive source fixing portion and the first pivot holder;

the second crank portion, is bent to be crank-shaped and extends between the drive source fixing portion and the second pivot holder; and the first crank portion includes the first and second bent sections, the second crank portion includes the third and fourth bent sections, and bending angles of the first and second bent sections are smaller than bending angles of the third and fourth bent sections.

5. The wiper device according to claim 4, wherein the drive source fixing portion has a longitudinal axis spaced apart from the straight line, which lies along the axes of the first and second coupling-fixing portions, in a direction extending from the distal ends to the basal ends of the pivot shafts.

6. The wiper device according to claim 2, further comprising:

a pivot lever which swings integrally with the first pivot shaft;

wherein the drive link rod is coupled to the pivot lever at a first side of a shaft coupling line, which extends through the first and second pivot shafts when viewed from a substantially axial direction of the pivot shafts;

among the first and second bent sections, the first bent section at the side of the first coupling-fixing portion is bent to extend from the first coupling-fixing portion in a direction extending from the distal ends to the basal ends of the pivot shafts and to extend toward a first side of the shaft coupling line;

among the first and second bent sections, the second bent section at the side of the drive source fixing portion is bent to arrange the drive source fixing portion in the first side of the shaft coupling line; and the first bent section and the second bent section set the arrangement of a crank intermediate section, which connects the first bent section and the second bent section, so that the drive link rod moves along a plane intersecting the crank intermediate section when viewed from a direction perpendicular to axes of the pivot shafts without contacting the crank intermediate section.

7. A wiper device comprising:

first and second pivot shafts, each having a distal end to which a wiper arm is fixed;

first and second pivot holders fixed to a vehicle body, which pivotally support the first and second pivot shafts and include first and second attachment shafts, respectively;

a hollow frame formed by a hollow member, which couples the pivot holders to each other;

a drive source fixed to the hollow frame;

a drive link rod which transmits drive force of the drive source to the first pivot shaft; and a synchronization link rod which further transmits drive force of the drive link rod to the second pivot shaft;

wherein the hollow frame includes first and second coupling-fixing portions, which are respectively fixed to the first and second pivot holders, and a drive source fixing portion, which is arranged between the first and second coupling-fixing portions and fixed with the drive source;

the hollow frame is bent so as to arrange the drive source fixing portion spaced apart from the first and second pivot holders in a direction extending from the distal ends towards basal ends of the pivot shafts; and the hollow frame includes a first crank portion, which is bent to be crank-shaped and extends between the drive source fixing portion and the first pivot holder, the first crank portion including first and second bent sections respectively bent about bending axes, which are not parallel to each other.

8. The wiper device according to claim 7, wherein the hollow frame includes a second crank portion which is bent to be crank-shaped and extends between the drive source fixing portion and the second pivot holder, the second crank portion including third and fourth bent sections respectively bent about bending axes, which are not parallel to each other.

9. The wiper device according to claim 8, wherein the axes of the first and second coupling-fixing portions lie along a straight line, the drive source fixing portion has a longitudinal axis spaced apart from the straight line, which lies along the axes of the first and second coupling-fixing portions, in a direction extending from the distal ends to the basal ends of the pivot shafts.

10. The wiper device according to claim 8, wherein bending angles of the first and second bent sections are smaller than bending angles of the third and fourth bent sections.

11. The wiper device according to claim 7, wherein the drive source is fixed to the drive source fixing portion and is also supported by the vehicle body.

12. The wiper device according to claim 7, wherein the first and second attachment shafts are respectively crimped and fixed to the coupling-fixing portions in a state inserted into the corresponding coupling-fixing portions along axes of the coupling-fixing portions, and the axes of the first and second coupling-fixing portions lie along a straight line.

13. The wiper device according to claim 7, further comprising:

a pivot lever which swings integrally with the first pivot shaft;

wherein the drive link rod is coupled to the pivot lever at a first side of a shaft coupling line, which extends through the first and second pivot shafts when viewed from a substantially axial direction of the pivot shafts;

among the first and second bent sections, the first bent section at the side of the first coupling-fixing portion is bent to extend from the first coupling-fixing portion in a direction extending from the distal ends to the basal ends of the pivot shafts and to extend toward a first side of the shaft coupling line;

among the first and second bent sections, the second bent section at the side of the drive source fixing portion is bent to arrange the drive source fixing portion in the first side of the shaft coupling line; and the first bent section and the second bent section set the arrangement of a crank intermediate section, which connects the first bent section and the second bent section, so that the drive link rod moves along a plane intersecting the crank intermediate section when viewed from a direction perpendicular to axes of the pivot shafts without contacting the crank intermediate section.

* * * * *